United States Patent
Feller et al.

(10) Patent No.: US 9,229,633 B2
(45) Date of Patent: *Jan. 5, 2016

(54) SELECTIVE SHARING OF DISPLAYED CONTENT IN A VIEW PRESENTED ON A TOUCHSCREEN OF A PROCESSING SYSTEM

(71) Applicant: International Business Machines Corporation, Armonk, NY (US)

(72) Inventors: John A. Feller, Cary, NC (US); John K. Gerken, III, Apex, NC (US); Harsha V. Krishnareddy, Cupertino, CA (US); Mark D. Vickstrom, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 44 days.

This patent is subject to a terminal disclaimer.

(21) Appl. No.: 14/015,042

(22) Filed: Aug. 30, 2013

(65) Prior Publication Data

US 2014/0149949 A1 May 29, 2014

Related U.S. Application Data

(63) Continuation of application No. 13/687,506, filed on Nov. 28, 2012.

(51) Int. Cl.
*G06F 3/048* (2013.01)
*G06F 3/0488* (2013.01)
*G06F 3/01* (2006.01)

(52) U.S. Cl.
CPC .......... *G06F 3/04883* (2013.01); *G06F 3/017* (2013.01); *G06F 3/04886* (2013.01)

(58) Field of Classification Search
CPC ... G06F 3/017; G06F 3/04883; G06F 3/0488; G06F 3/04886; G06F 3/0482; G06F 3/04842; G06F 3/0481; G06F 3/04845; G06F 3/0485
See application file for complete search history.

(56) References Cited

U.S. PATENT DOCUMENTS

| | | |
|---|---|---|
| 2008/0036743 A1 | 2/2008 | Westerman et al. |
| 2008/0163130 A1 | 7/2008 | Westerman |
| 2008/0184124 A1 | 7/2008 | Agarwal et al. |
| 2010/0149090 A1 | 6/2010 | Morris et al. |
| 2010/0153866 A1 | 6/2010 | Sharoni |
| 2010/0185949 A1 | 7/2010 | Jaeger |
| 2011/0083111 A1* | 4/2011 | Forutanpour et al. ......... 715/863 |
| 2011/0252381 A1 | 10/2011 | Chaudhri |

(Continued)

OTHER PUBLICATIONS

Jorgenson et al.; Client-Side Rendering of Collaborative Idea Networks; © 2012; IEEE; pp. 381-388.*

(Continued)

*Primary Examiner* — Linh K Pham
(74) *Attorney, Agent, or Firm* — Cuenot, Forsythe & Kim, LLC (57) ABSTRACT

A method for sharing a view presented on a touchscreen of a processing system. Whether a show gesture state is enabled on the processing system and whether a gesture event gate is open on the processing system are determined. The show gesture state determines whether a gesture detected by the touchscreen is depicted onto a version of the view shared with another processing system. The gesture event gate determines whether a corresponding gesture event is passed to an application that is active in the view.

8 Claims, 4 Drawing Sheets

(56) References Cited

U.S. PATENT DOCUMENTS

| | | | |
|---|---|---|---|
| 2012/0019562 A1* | 1/2012 | Park et al. .................. 345/657 | |
| 2012/0218200 A1* | 8/2012 | Glazer ............... G06F 3/04883 345/173 | |
| 2012/0306748 A1* | 12/2012 | Fleizach ................ G06F 3/033 345/161 | |
| 2014/0082557 A1 | 3/2014 | Warner | |
| 2014/0108991 A1* | 4/2014 | Zhai .................... G06F 3/04886 715/773 | |
| 2014/0149946 A1 | 5/2014 | Feller et al. | |
| 2014/0189568 A1* | 7/2014 | Zhai .................... G06F 3/04886 715/773 | |
| 2015/0067560 A1* | 3/2015 | Cieplinski ........... G06F 3/04842 715/765 | |

OTHER PUBLICATIONS

U.S. Appl. No. 13/687,506, Non-Final Office Action, Jul. 31, 2014, 11 pg.

Martin, W., "Lost Pointer in Tablet Projection?" [online] Busynessgirl What Are You Learning? © 2012, WordPress, [retrieved Nov. 27, 2012] retrieved from the Internet: <http://busynessgirl.com/lost-pointer-in-tablet-projection/>, 9 pgs.

Mock, K., "PenAttention, Highlight Your Pen or Mouse Cursor," [online] [retrieved Nov. 27, 2012] retrieved from the Internet: <http://www.math.uaa.alaska.edu/~afkjm/PenAttention/>, 1 pg.

Ariyatrakool, N., "Art of Glow," [online] iTunes Preview, Aug. 22, 2012, © 2009-2012 Natenai Ariyatrakool, [retrieved Nov. 27, 2012] retrieved from the Internet: <https://itunes.apple.com/us/app/art-of-glow/id387680399?mt=8>, 3 pgs.

"Cisco WebEx Meetings for iPad and iPhone: Attend meetings on the go with Cisco WebEx Meetings for Apple iOS!" [online] Cisco © 2012, [retrieved Nov. 28, 2012] retrieved from the Internet: <http://www.webex.com/products/web-conferencing/mobile-iphone-ipad-faq.html>, 6 pgs.

"Mobile Meetings" [online] Lotuslive.com, International Business Machines Corporation © 2012 retrieved from the Internet: <https://apps.lotuslive.com/meetings/mobileMeetingApps.jsp?locale=en_US>, 1 pg.

"Telestrator," [online] Wikipedia, the Free Encyclopedia, Nov. 5, 2012 [retrieved Nov. 28, 2012] retrieved from the Internet: <http://en.wikipedia.org/wiki/Telestrator>, 3 pgs.

"Comet Trail," [online] Softpedia, © 2001-2012, retrieved from the Internet: <http://webscripts.softpedia.com/script/Internet-Browsers-C-C/Comet-Trail-23635.html>, 2 pgs.

"Presentation Tools," [online] WebTools4U2Use, Tangient LLC © 2012 [retrieved Nov. 28, 2012] retrieved from the Internet: <http://webtools4u2use.wikispaces.com/Presentation+Tools>, 8 pgs.

Microsoft Device Emulator 3.0—Standalone Release, [online] Microsoft Download Center, Microsoft Corp. © 2012 [retrieved Nov. 28, 2012] retrieved from the Internet: <http://www.microsoft.com/en-us/download/details.aspx?id=5352>, 2 pgs.

* cited by examiner

SELECTIVE SHARING OF DISPLAYED CONTENT IN A VIEW PRESENTED ON A TOUCHSCREEN OF A PROCESSING SYSTEM

CROSS-REFERENCE TO RELATED APPLICATIONS

This application is a Continuation of U.S. application Ser. No. 13/687,506, filed on Nov. 28, 2012, the entirety of which is incorporated herein by reference.

BACKGROUND

With continued proliferation of communication services, the use of tablet computers and smartphones continues to grow. A tablet computer is a computing device that includes an integrated touchscreen that facilitates the primary means of interaction with the device by the user. This interaction is performed by "gestures" that consist of one or more fingers touching the touchscreen and then moving the fingers in a deterministic fashion recognized by the device. Mobile computing devices with touchscreens also do not typically include a keyboard or mouse. A smartphone is a mobile phone that includes a touchscreen that operates in a similar manner. In this regard, a smartphone may include functionality equal to, or similar to, a tablet computer. As use of tablet computers and smart phones continues to grow, so too does the use of desktop computers, workstations and laptop computers that include, or otherwise are communicatively linked, to touchscreen based devices. Indeed, user interfaces for many popular operating systems are becoming ever more touch and gesture centric.

BRIEF SUMMARY

One or more embodiments disclosed within this specification relate to sharing a view presented on a touchscreen of a processing system.

An embodiment can include a method for sharing a view presented on a touchscreen of a processing system. The method can include determining whether a show gesture state is enabled on the processing system and determining whether a gesture event gate is open on the processing system. When the show gesture state is enabled and the gesture event gate is open, a gesture detected by the touchscreen can be depicted onto a version of the view shared with another processing system, and a corresponding gesture event can be passed to an application that is active in the view. When the show gesture state is enabled and the gesture event gate is not open, the gesture detected by the touchscreen can be depicted onto the version of the view shared with another processing system, and the corresponding gesture event is not passed to the application that is active in the view. When the show gesture state is disabled and the gesture event gate is open, the gesture detected by the touchscreen is not depicted onto the version of the view shared with another processing system, and the corresponding gesture event is passed to the application that is active in the view.

Another embodiment can include a method for sharing a view presented on a touchscreen of a processing system. The method can include detecting, via the touchscreen, a gesture input by a user. The method also can include determining whether a show gesture state is enabled on the processing system and determining whether a gesture event gate is open on the processing system. When the show gesture state is enabled and the gesture event gate is open, the gesture can be depicted onto a version of the view shared with another processing system, and a corresponding gesture event can be passed to an application that is active in the view. When the show gesture state is enabled and the gesture event gate is not open, the gesture can be depicted onto the version of the view shared with another processing system, and the corresponding gesture event is not passed to the application that is active in the view. When the show gesture state is disabled and the gesture event gate is open, the gesture is not depicted onto the version of the view shared with another processing system, and the corresponding gesture event is passed to the application that is active in the view.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium refers to a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to sharing a view presented on a touchscreen of a first processing system, and selectively sharing gestures detected by the touchscreen with one or more other processing system. A user of the first processing system can choose when gestures are to be shared, and the gestures can be shared accordingly. The user also can choose when gestures are to be detected as gesture events passed to an application that is active in the view. Accordingly, the user can choose to share gestures with other users, for example to provide emphasis on certain content presented in the view, while not causing the presently active application to act on such gestures. Moreover, gestures that are passed through to the application can be enhanced or highlighted, for example using comment trails or other suitable gesture enhancements, as will be described herein.

Figure 1:
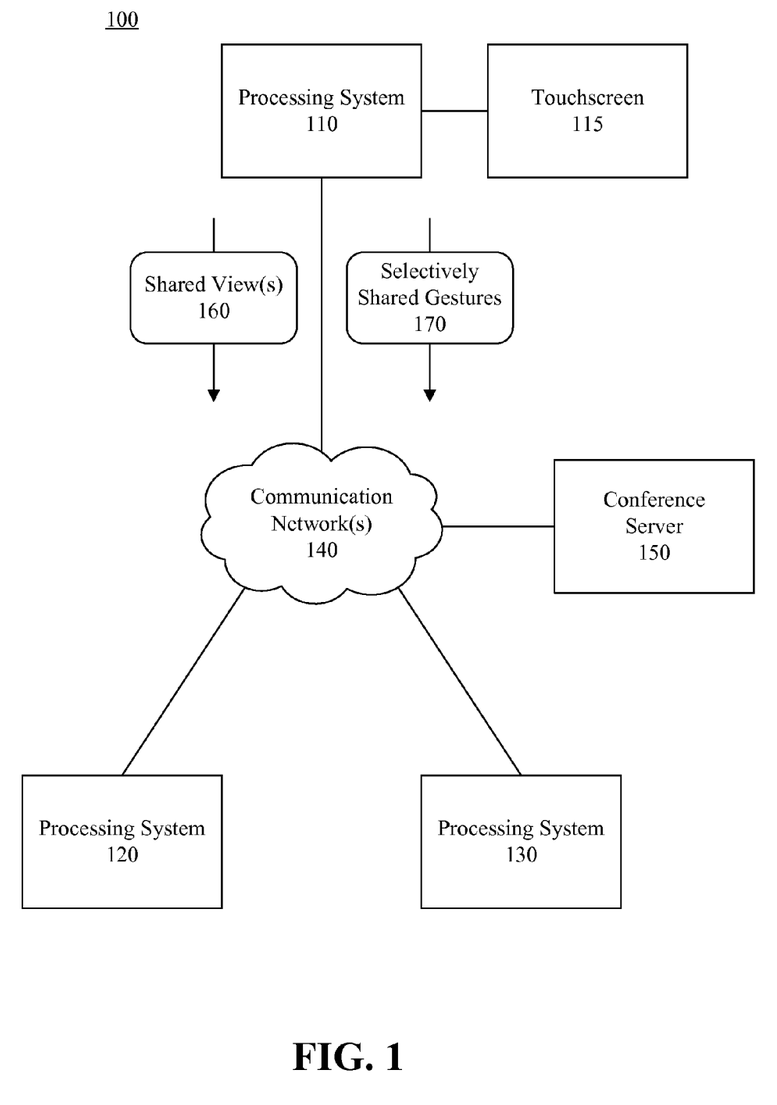
FIG. 1 is a block diagram illustrating a system for sharing a view presented on a touchscreen of a processing system in accordance with one embodiment disclosed within this specification.

FIG. 1 is a block diagram illustrating a system 100 for sharing a view presented on a touchscreen 115 of a processing system 110 in accordance with one embodiment disclosed within this specification. In one arrangement, the touchscreen 115 can be integrated into the processing system 110, for example in tablet computer, smart phone, personal digital assistant, appliance, gaming device or all-in-one computer in which the touchscreen is integrated with other components of the processing system 110. In another arrangement, the touchscreen 115 can be communicatively linked to the processing system 110. For example, the touchscreen 115 can be communicatively linked to the processing system 110 via a suitable communication port, video port or video card. In this regard, gestures, such as touches on the touchscreen 115 or gestures above or in front of the touchscreen 115, can be detected by the touchscreen 115 and communicated to the processing system 110.

The processing system 110 can be communicatively linked to one or more other processing systems 120, 130 via one or more suitable communication networks 140. Examples of suitable communication networks in include, but are not limited to, LANs, wireless LANs, WANs, wireless WANs, cellular communication networks, the Internet, and the like. In one arrangement, system 100 can include a conference server 150 to facilitate communication among the processing systems 110-130. For example, the conference server 150 can receive content for a view to be shared by the processing system 110, and communicate the content/view to the processing systems 120, 130.

In operation, the processing system 110 can share one or more views 160 of content presented on the touchscreen 115 with the processing systems 120-130 via the communication network(s) 140, either directly or via the conference server 150. A user of the processing system 110 can choose whether gestures provided to the touchscreen 115, for example by the user, are to be shared with the processing systems 120, 130 as shared gestures 170 to be depicted on the shared view(s) 160 when presented to other users by the processing systems 120, 130. In other words, the user can choose to selectively share the gestures 170. The user also can choose whether gesture events corresponding to such gestures are to be passed to a presently active application on the processing system 110, for example an application presenting the shared view 160 on the touchscreen 115.

Figure 2:
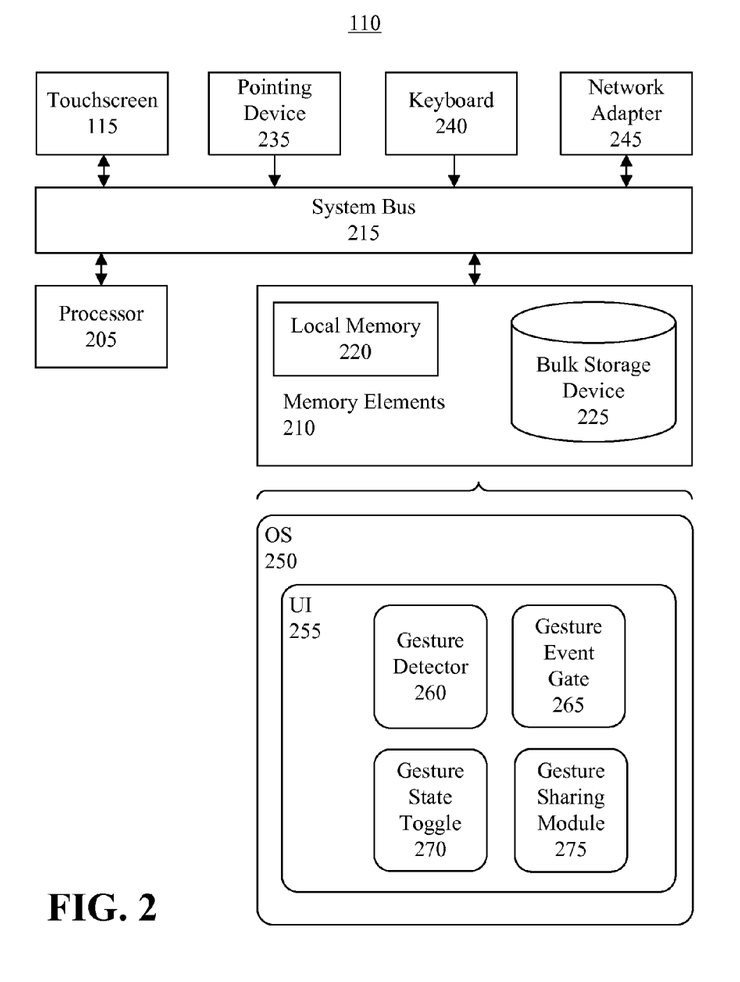
FIG. 2 is a block diagram illustrating an example of a processing system 110 for sharing a view presented on a touchscreen in accordance with an embodiment disclosed within this specification.

FIG. 2 is a block diagram illustrating an example of the processing system 110 in accordance with an embodiment disclosed within this specification. The processing system 110 can include at least one processor 205 (e.g., a central processing unit) coupled to memory elements 210 through a system bus 215 or other suitable circuitry. As such, the processing system 110 can store program code within the memory elements 210. The processor 205 can execute the program code accessed from the memory elements 210 via the system bus 215. It should be appreciated that the processing system 110 can be implemented in the form of any system including a processor and memory that is capable of performing the functions and/or operations described within this specification. For example, the processing system 110 can be implemented as a computer, a workstation, a mobile computer, a laptop computer, tablet computer, a smart phone, a personal digital assistant, a gaming device, an appliance, and so on.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The processing system 110 also can include one or more cache memories (not shown) that provide temporary storage of at least some program code in order to reduce the number of times program code must be retrieved from the bulk storage device 225 during execution.

Input/output (I/O) devices such as a touchscreen 115 and, optionally, a pointing device 235 (e.g., a mouse or touchpad) and a keyboard 240 can be coupled to the processing system 110. The I/O devices can be coupled to the processing system 110 either directly or through intervening I/O controllers. For example, the touchscreen 115 can be coupled to the processing system 110 via a graphics processing unit (GPU), which may be a component of the processor 205 or a discrete device. One or more network adapters 245 also can be coupled to processing system 110 to enable processing system 110 to become coupled to other systems, computer systems, remote printers, and/or remote storage devices through intervening private or public networks. Modems, cable modems, and Ethernet cards are examples of different types of network adapters 245 that can be used with processing system 110.

As pictured in FIG. 2, the memory elements 210 can store the components of the processing system 110, for example an operating system 250. The operating system 250 can include a user interface 255, which presents content on the touchscreen 115 and receives user gestures (e.g., touches on the touchscreen 115 and/or gestures above or in front of the touchscreen 115). In an arrangement in which a pointing device 235 and/or keyboard 240 is provided, the user interface 255 also can receive user inputs via the pointing device 235 and/or keyboard 240.

The user interface 255 can include a gesture detector 260, a gesture event gate 265, a gesture state toggle 270 and a gesture sharing module 275. The components 260-275 can be native to the user interface 255, or applications or plugins added to the operating system 250 and/or user interface 255, for example as one or more application program interfaces. In another arrangement, the components 260-275 can be included in an application configured to be executed by the processing system 110 and can interact with the user interface 255.

Being implemented in the form of executable program code, the components 250-275 of the processing system 110 can be executed by the processing system 110 and, as such, can be considered part of the processing system 110. Moreover, the operating system 250, user interface 255, gesture detector 260, gesture event gate 265, gesture state toggle 270 and gesture sharing module 275 are functional data structures that impart functionality when employed as part of the processing system 110 of FIG. 2.

In operation, the gesture detector 260 can receive from the touchscreen 115 gestures detected by the touchscreen 115 and selectively pass corresponding gesture events to an application that is active or in focus in a view on the touchscreen 115. In illustration, the user also can selectively open or close the gesture event gate 265 by either a software configuration setting or via a physical switch. When the gesture event gate 265 is open, gesture events corresponding to gestures detected by the touchscreen 115 can be passed to the application that is active in a view or in focus on the touchscreen 115, for example when the gestures are detected by the touchscreen 115 in or over a view presented by the application. Accordingly, the application can process the gestures in a conventional manner. Gestures normally not processed by the application need not be passed to the application, however. In contrast, when the gesture event gate 265 is closed, gesture events corresponding to gestures detected by the touchscreen 115 are not passed to the application that is active in a view on the touchscreen 115.

The gesture detector 260, via the gesture sharing module 275, also can selectively share the gestures with other processing systems so as to depict the gestures onto a version of a view by the processing system 110 shared with the other processing systems. In illustration, the gesture state toggle 270 can be toggled via a user input. When the user enables the show gesture state, gestures detected by the touchscreen 115 can be depicted onto a version of a view shared by the processing system 110 with one or more other processing systems. For example, the gesture can be depicted as a trail or with other suitable gesture effects in the shared view. In one aspect, the gesture sharing module 275 can process the detected gestures to determine which gestures are shared and which gestures are not shared. For instance, the gesture sharing module 275 need not share gestures outside of the view being shared, though the present arrangements are not limited in this regard. In illustration, user gestures interacting with operating system 250 need not be shared with other processing systems, unless the operating system 250 is the subject of the view. The gesture sharing module 275 can communicate the gestures to the other processing systems, or communicate the gestures to another system, such as a conference server, which passes the shared gestures to the other processing systems. The user also can selectively disable the show gesture state, in which case gestures detected by the touchscreen 115 are not depicted onto the shared version of the view.

Further, the gesture sharing module 275 can include a variety of user selectable settings that control the manner in which gestures are presented on other processing systems, or on the processing system 110 and other processing systems, when the gesture state toggle is enabled. For instance, the user can select whether gesture enhancements are to be applied to enhance the way gestures are visually presented, the types of enhancements that are to be applied, and the like. Such enhancements can be applied both to the view presented on the processing system 110 and other processing systems with which the view is shared, or only to the view shared with the other processing systems, for example based on a user selectable setting.

The gesture enhancements can include, but are not limited to, a type of trail depicted to follow gestures (e.g., a comet trail), whether the trail fades, the size and color of the trail, whether the trail persists until a next gesture is received or persists until another gesture is received that is a certain type of gesture, a manner in which the trail fades, a period of time over which the trail fades, correction of gesture rendering to provide straight line movements, circles, and proper arcs, etc. Further, if a user inputs a gesture with two appendages (e.g., fingers) in a manner in which the appendages move away from each other, the gesture enhancements can provide a rendering of such movements as moving 180° relative to one another. In this regard, the gesture sharing module 275 can compute movement vectors for the gesture inputs (e.g., based on initial movement by one or more appendages providing the gestures, start and end points of the gestures, etc.), and render the gestures as proper gestures according to the movement vectors, even though the actual gestures themselves may not be proper gestures. In this regard, a proper gesture can be a line that is at least substantially straight, a circle that is at least a substantially perfect circle, an arc that is at least a substantially perfect arc, at least two lines that are rendered at least substantially 180° relative to one another, or the like. Still, any other suitable enhancements can be applied to rendering of the gestures as such gestures are to be depicted on the view when the view is presented on the other processing systems, or on the processing system 110 and other processing systems, and the present arrangements are not limited in this regard.

In view of the foregoing, a user of the processing system 110 can configure operation of the processing system 110 to allow the user to visually share gestures with others without interfering with execution of an application presenting a view, share the gestures while interacting with the underlying application, or disable gesture sharing.

Moreover, in one arrangement, a user interaction area can be presented on the touchscreen 115 by the user interface 255. The user interaction area can remain private to the user and not presented to other users with whom the shared view(s) is/are shared, or can be presented in the shared view(s). In the user interaction area, user inputs (e.g., gestures or other inputs) can be entered by the user to open or close the gesture event gate 265, enable or disable the gesture state toggle 270, activate or deactivate gesture enhancements and/or select the type of gesture enhancements to be applied. The user interaction area can include buttons, menu items, icons and/or the like configured to receive such user inputs. In another arrangement, such user inputs can be received via one or more keys (e.g., hot keys) on the pointing device 235 or keyboard 240, one or more hardware buttons on the touchscreen 115, or one or more buttons elsewhere in or on the processing system 110. In yet another arrangement, the gesture detector 260 can be configured to recognize one or more gestures as user inputs to open or close the gesture event gate 265, enable or disable the gesture state toggle 270, select gesture enhancements, etc. Such gestures can include, for example, a certain number of taps on the touchscreen 115, a particular type of movement on or above/in front of the touchscreen, or the like. Current states of the gesture event gate 265, gesture state toggle 270 and gesture enhancements can be indicated to the user using any suitable indicator(s), for example by presenting corresponding icons, effects to icons or buttons, presenting corresponding text or symbols, etc.

Figure 3:
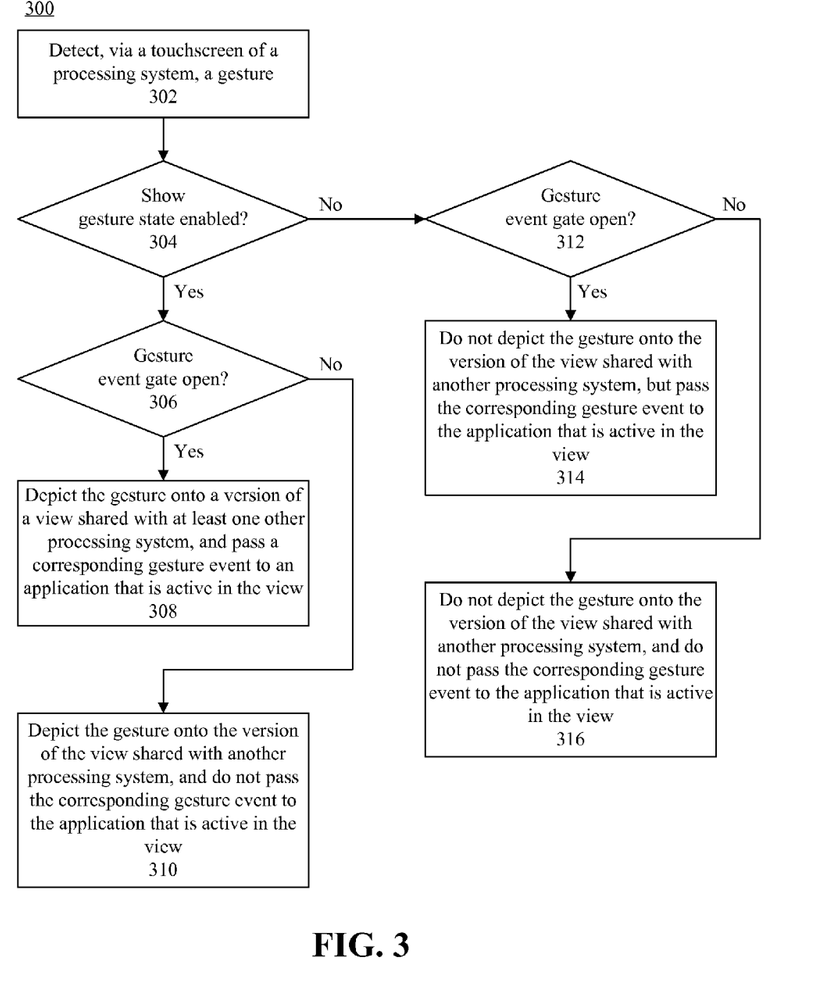
FIG. 3 is a flow chart illustrating a method of sharing a view presented on a touchscreen of a processing system in accordance with an embodiment disclosed within this specification.

FIG. 3 is a flow chart illustrating a method 300 of sharing a view presented on a touchscreen of a processing system in accordance with an embodiment disclosed within this specification. At step 302, via a touchscreen of a first processing system, a gesture can be detected. At decision box 304, if a show gesture state is enabled, the process can proceed to decision box 306, and a determination can be made whether a gesture event gate is open. If so, at step 308, the gesture can be depicted onto a version of a view presented on the processing system that is shared with at least one other processing system, and a corresponding gesture event can be passed to an application that is active in the view presented on the first processing system. If at decision box 306 a determination is made that the gesture event gate is not open, at step 310, the gesture can be depicted onto the version of the view presented on the processing system that is shared with at least one other processing system, and the corresponding gesture event is not passed to the application that is active in the view presented on the first processing system.

Referring again to decision box 304, if the show gesture state is not enabled, at decision box 312 a determination can be made whether the gesture event gate is open. If so, at step 314, the gesture is not depicted onto the version of the view shared with another processing system, but the corresponding gesture event can be passed to the application that is active in the view. If at decision box 312 a determination is made that the gesture event gate is not open, at step 316, the gesture is not depicted onto the version of the view shared with another processing system, and the corresponding gesture event is not passed to the application that is active in the view.

In another arrangement, in lieu of step 316, and indication can be provided to a user indicating an invalid state. For example, a message can be provided, for instance as a pop-up message presented on the touchscreen, indicating that the show gesture state is disabled and the gesture event gate is not open, and thus further processing of the gesture will not occur. In yet another arrangement, such message can be presented when the user attempts to close the event gate while the show gesture state is disabled, or the user attempts to disable the show gesture state while the gesture gate is closed. Further, if the user attempts to close the gesture event gate while the show gesture state is disabled, the processing system can automatically enable the show gesture state. If the user attempts to disable the show gesture state while the gesture event gate is closed, the gesture event gate can be automatically opened. Such automatic changes can be indicated to the user in a suitable manner.

Figure 4:
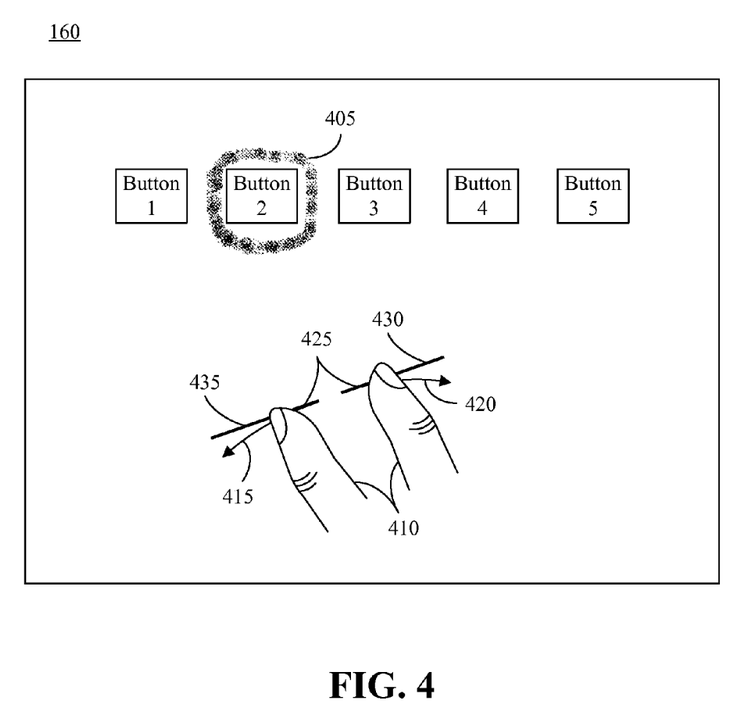
FIG. 4 depicts an example of a shared view presented on a touchscreen of a processing system in accordance with an embodiment disclosed within this specification.

FIG. 4 depicts an example of a shared view 160 presented on a touchscreen of a processing system in accordance with an embodiment disclosed within this specification. The view 160 can be presented on the touchscreen 115 of the processing system 110 of FIG. 1, and shared with the processing systems 120, 130.

While the view 160 is shared, the user can provide user gestures, such as touches to the touchscreen, and such gestures can be depicted on the version of the view 160 shared with the processing systems 120, 130. For example, if the user uses his/her finger to circle button 2, the gesture 405 can be shared with the processing systems 120, 130 for presentation on the shared versions of the view 160. The gesture 405 can be depicted as a line, a comet trail, or other suitable gesture depiction, surrounding the button 2. The shared gesture 405 can be depicted precisely how the circle is drawn by the user, or the gesture sharing module can correct the gesture 405 to form a perfect circle. Further, the gesture 405 can be drawn from a start point where the user begins the circle to an end point where the user ends the circle and drawn at a rate that tracks the rate at which the user moves his/her finger in the circular pattern. Also, additional gesture effects can be applied to the shared gesture 405, as previously discussed.

Further, the user of the processing system 110 can use his/her fingers 410 to perform a "zoom in" gesture. The user may move the fingers 410 in opposing directions 415, 480 that are not precisely 180° relative to one another. Nonetheless, the gesture 425 that is shared with the processing systems 120, 130 for presentation on the shared versions of the view 160 can be depicted with respective segments 430, 435 drawn to be precisely 180° relative to one another. For instance, each segment 430, 435 can begin approximately where the user initially touches the touchscreen with the fingers 420 when moving the respective fingers 420 in opposing directions. The segments 430 can be depicted as lines, comet trails, or any other suitable gesture depictions. Again, each segment 430, 435 can be drawn from a start point to an end point to track the rate at which the user moves his/her fingers 410 in opposing directions. Also, additional gesture effects can be applied to the shared gesture 425, as previously discussed.

In addition, numerous other gestures can be shared, and the present arrangements are not limited to these examples. Other gestures may include, for example, "zoom out" gestures, lines, double lines, triple lines, arcs, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method comprising:
    sharing a version of a view presented on a touchscreen of a processing system with at least a second processing system;
    determining whether a show gesture state is enabled on the processing system;
    determining whether a gesture event gate is open on the processing system;
    indicating, on the touchscreen, at least one indicator that indicates whether the show gesture state is enabled and whether the gesture event gate is open;
    responsive to detecting a gesture by the touchscreen when the show gesture state is enabled and the gesture event gate is open, depicting the gesture detected by the touchscreen onto the version of the view shared with the second processing system, and passing a corresponding gesture event to an application that is active in the view;
    responsive to detecting a gesture by the touchscreen when the show gesture state is enabled and the gesture event gate is not open, depicting the gesture detected by the touchscreen onto the version of the view shared with the second processing system, and not passing the corresponding gesture event to the application that is active in the view; and
    responsive to detecting a gesture by the touchscreen when the show gesture state is disabled and the gesture event gate is open, not depicting the gesture detected by the touchscreen onto the version of the view shared with the second processing system, and passing the corresponding gesture event to the application that is active in the view.

2. The method of claim 1, further comprising: receiving a user input to enable or disable the show gesture state.

3. The method of claim 1, further comprising: receiving a user input to open or close the gesture event gate.

4. The method of claim 1, wherein depicting the gesture detected by the touchscreen onto the version of the view shared with another processing system comprises: applying a gesture effect to the depicted gesture.

5. The method of claim 4, wherein the gesture effect applied to the depicted gesture is user selectable.

6. The method of claim 4, wherein applying the gesture effect comprises:
   computing a movement vector for the gesture, wherein the gesture is not a proper gesture; and
   rendering the gesture as the proper gesture according to the movement vector.

7. The method of claim 6, wherein rendering the gesture as the proper gesture according to the movement vector comprises:
   rendering the gesture as a line, a circle, an arc, or at least two lines that are 180° relative to one another.

8. A method comprising:
   sharing a version of a view presented on a touchscreen of a processing system with at least a second processing system;
   detecting, via the touchscreen, a gesture input by a user;
   determining whether a show gesture state is enabled on the processing system;
   determining whether a gesture event gate is open on the processing system;
   indicating, on the touchscreen, at least one indicator that indicates whether the show gesture state is enabled and whether the gesture event gate is open; and
   responsive to detecting the gesture by the touchscreen when the show gesture state is enabled and the gesture event gate is open, depicting the gesture onto the version of the view shared with the second processing system, and passing a corresponding gesture event to an application that is active in the view; or
   responsive to detecting the gesture by the touchscreen when the show gesture state is enabled and the gesture event gate is not open, depicting the gesture onto the version of the view shared with the second processing system, and not passing the corresponding gesture event to the application that is active in the view; or
   responsive to detecting the gesture by the touchscreen when the show gesture state is disabled and the gesture event gate is open, not depicting the gesture onto the version of the view shared with the second processing system, and passing the corresponding gesture event to the application that is active in the view.

* * * * *